United States Patent [19]
Lowther

[11] 3,963,625
[45] June 15, 1976

[54] OZONE GENERATION AND RECOVERY SYSTEM

[75] Inventor: Frank E. Lowther, Severna Park, Md.

[73] Assignee: W. R. Grace & Co., Columbia, Md.

[22] Filed: Mar. 12, 1975

[21] Appl. No.: 557,595

[52] U.S. Cl. .............................. 250/533; 204/176; 250/541
[51] Int. Cl.² ........................................ C01B 13/11
[58] Field of Search ............ 204/176; 250/533, 540, 250/541

[56] References Cited
UNITED STATES PATENTS

| | | | |
|---|---|---|---|
| 2,271,895 | 2/1942 | Hartman | 250/533 |
| 2,872,397 | 2/1959 | Kiffer | 204/176 |
| 3,663,418 | 5/1972 | Kawahata | 250/533 |

FOREIGN PATENTS OR APPLICATIONS

| | | | |
|---|---|---|---|
| 689,301 | 6/1964 | Canada | 250/541 |
| 525,800 | 6/1956 | Canada | 204/176 |

*Primary Examiner*—John H. Mack
*Assistant Examiner*—Aaron Weisstuch
*Attorney, Agent, or Firm*—John C. LeFever

[57] ABSTRACT

A continuous ozone generation and recovery system is provided including a source of oxygen-rich gas; at least one high-throughput corona generator; means for passing the oxygen-rich gas through an electrical corona at a high ratio of gas volume:electrode area to synthesize ozone in a concentration not greater than 1 wt% in the gas stream; means for cooling the generator and maintaining the ozone-containing oxygen stream below decomposition temperature; means for cooling the ozone-containing oxygen gas stream; means for contacting the cooled gas stream with silica gel to adsorb the ozone and recover an oxygen-rich gas stream; means for recycling the recovered oxygen-rich gas stream for ozone synthesis; and means for recovering the adsorbed ozone from the silica gel.

Recycle of unconverted oxygen has strong economic value. Dry nitrogen-rich gas stream from an air separation unit which also provides the oxygen source may be used advantageously as an inert carrier gas for desorbing the ozone.

7 Claims, 1 Drawing Figure

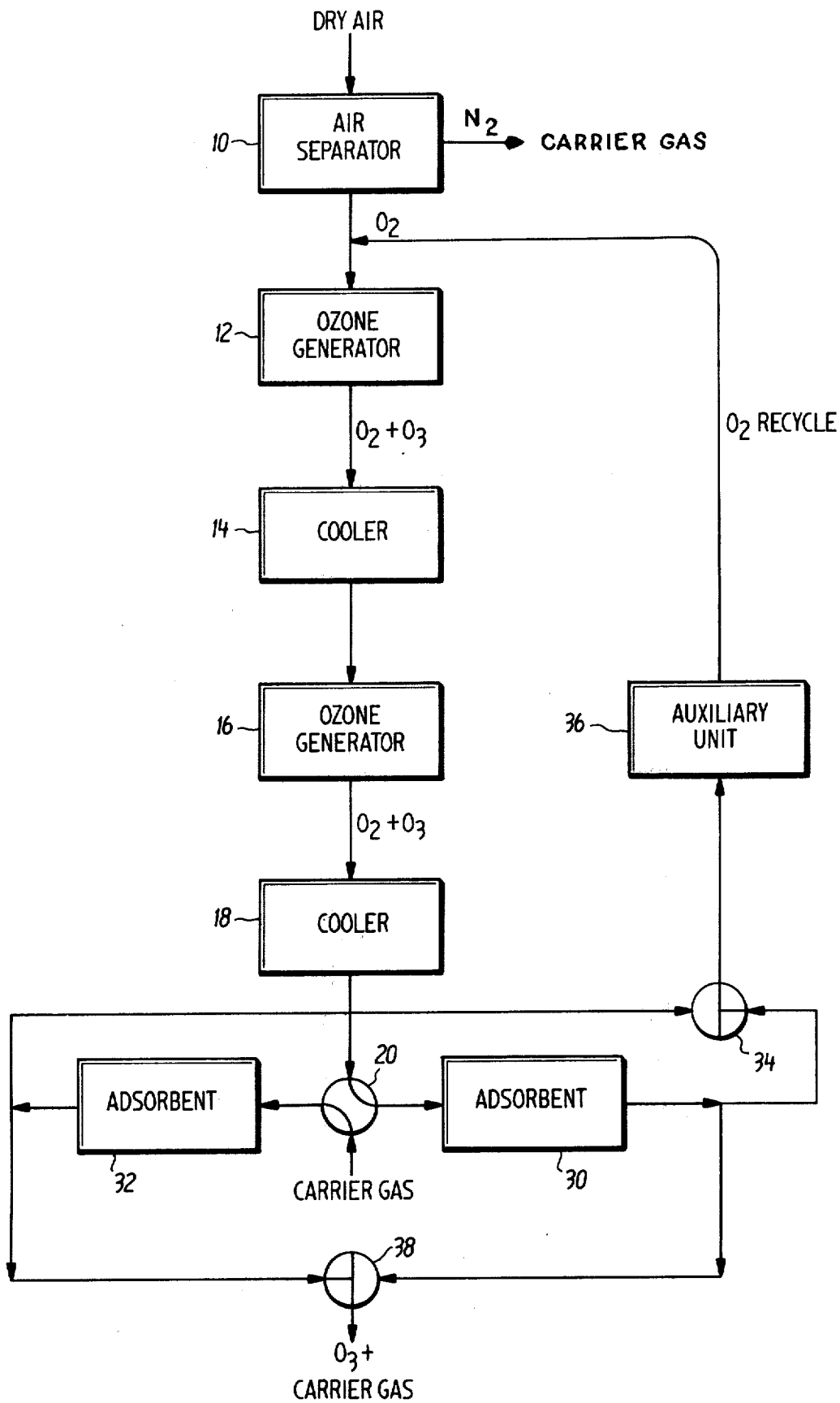

3,963,625

OZONE GENERATION AND RECOVERY SYSTEM

BACKGROUND OF THE INVENTION

This invention relates to the field of ozone synthesis. It presents a new operating process and apparatus for producing ozone from an oxygen-rich gas on a continuous basis, as required for many industrial oxidation demands, such as manufacture of peroxides and organic acids, treatment of municipal sewage and manufacturing wastes, large-scale disinfection and odor control applications, bleaching and treatment of potable water. Advantages have been found in the use of clean dry oxygen-rich gas for ozone synthesis as compared to air. A silent electric discharge type ozonizer will produce more than twice the amount of ozone using oxygen feed, thereby reducing the capital cost of corona generating equipment. The energy required to produce a given weight of ozone product is decreased by more than half whereby the operating cost for the generator is reduced. Also, the maximum ozone concentration obtainable is increased by about the same factor employing 90% + oxygen purity.

The cost of producing the oxygen-rich feedstream for a continuous ozone generating plant is sufficiently high that most of the oxygen passed through the ozone generating equipment must be recovered and recycled to make the process economical. A method for recovering and recycling ozone has been described by Kiffer in U.S. Pat. No. 2,872,397. According to this prior art system, oxygen in a relatively pure form is converted by electric discharge reactor into ozone and the resulting gas mixture containing a major fraction of oxygen and a minor fraction of ozone is passed through a bed of adsorbent particles, such as silica gel. The ozone is adsorbed by silica gel and the remaining oxygen is passed through the bed for recovery and recycle. The recycle stream is replenished continuously or periodically with oxygen in an amount to compensate for that which is converted to ozone product in the generator. Typically, two or more adsorption units are employed so that when the adsorbent silica gel in one vessel reaches the saturation point for ozone capacity the ozone containing gas may be switched to other adsorption units. While the ozone-containing oxygen-rich stream from the ozone generator is being treated in the second adsorption unit, the ozone in the first unit is being removed from the adsorbent using a stripping gas such as air, nitrogen or other diluent gas which acts as a carrier for the ozone. This results in a safe ozone-carrier gas mixture suitable for subsequent chemical reaction without explosion hazards inherent in oxygen-ozone mixtures. The adsorption temperatures according to prior art methods may be about −80°C to +20°C. It is known that the adsorption capacity of silica gel decreases markedly as temperature approaches ambient.

SUMMARY OF THE INVENTION

Multi-stage ozone generating processes and apparatus have been discovered wherein an oxygen gas stream is cooled between stages of ozone generation in a high throughput system providing methods and means for separating air into an oxygen gas stream and a nitrogen gas stream;

passing the oxygen gas stream through the multistage process producing a cool ozone-containing oxygen gas stream;

contacting the ozone-containing oxygen gas stream with a solid adsorbent to remove and adsorb ozone;

recycling the oxygen gas stream to the ozone generating subsystem;

contacting the ozone-laden adsorbent with a carrier gas, such as nitrogen, to desorb ozone; and recovering ozone product in the carrier gas.

The invention includes in its objects the provision of a novel continuous ozone generation and recovery system and operating process, including means for passing oxygen-rich gas through an electrical corona at a high ratio of gas volume:electrode area to synthesize ozone in a concentration increment not greater than 1 wt% in the gas stream. The system also provides means for cooling the ozone-containing oxygen gas stream between ozone generating stages and means for contacting the cooled gas stream with silica gel to adsorb the ozone and recover an oxygen-rich gas stream for recycle to obtain maximum utilization of expensive oxygen feedstock. A further object is to provide a pressure swing molecular sieve air separating apparatus having means for separating air into an oxygen-rich gas stream for the source of oxygen feed to the ozone generators and a nitrogen-rich gas stream having means for desorbing the ozone with nitrogen.

In another embodiment, a cryogenic air liquefaction means provides a gas source consisting essentially of oxygen and a nitrogen stream for desorbing ozone from the silica gel.

These and other objects and features of the invention will be shown in the following specification and in the drawing.

THE DRAWING

The single FIGURE is a process flow sheet and schematic diagram of the system, showing the relationship between operatively connected gas synthesis, treatment and recovery units.

DESCRIPTION OF PREFERRED EMBODIMENTS

In the following description, metric units and parts by weight are employed unless otherwise stated.

As shown in the accompanying drawing, a source of oxygen may be provided by air separator 10, supplied by a feedstream of dry air. A continuous stream of pure oxygen or oxygen-enriched gas containing minor amounts of inert gas is fed to a first ozone generator 12 wherein an initial positive concentration increment of ozone is synthesized, thus providing a stream of ozone-containing oxygen gas at a higher temperature, usually 50°C to 100°C. The process stream is reduced in temperature by a first heat exchange means or cooler 14, and passed to a second ozone generator 16 and second cooler 18. The number of ozone generating stages may vary widely, depending upon the efficiency of the electrical discharge corona generators, gas composition, etc. A cooled oxygen-rich gas containing at least 1% $O_3$, and preferably 3% or more $O_3$, is then passed to the ozone adsorption separation and recovery sub-system.

A four-way valve 20 provides fluid switching to alternating adsorbent beds 30, 32, where ozone is selectively adsorbed and a gas consisting essentially of oxygen is recovered for recycle to the ozone synthesis portion of the system. The recycle gas is controlled in its path by three-way valve 34 and the oxygen recycle stream may be introduced directly into the main supply stream of $O_2$ from the air separator 10.

The recycle stream may be treated continuously or intermittently to remove deleterious impurities or unwanted inert gas to improve the ozone generating efficiency and protect purity. For this purpose a bed of a crystalline aluminosilicate molecular sieve or other gas separating medium may be employed as part of auxiliary unit 36, disposed in the recycle conduit.

The ozone-laden adsorbent may be regenerated by passing a carrier gas, such as nitrogen or dry air through the bed while the other bed is being used in the adsorbing cycle. The preferred method of operating the recovery system employs dry nitrogen-rich gas from the air separator 10 as the carrier gas. The product ozone is then recovered in the carrier gas stream.

The air separator unit can provide both a source of oxygen and a carrier gas for the desorption or regeneration functions.

Separation of air into its main $O_2$ and $N_2$ components is well known.

Cryogenic processes based on the Joule-Thompson effect are available. The modified Linde-Frankl cycle is used in numerous industrial gas plants. Typical processes are described in U.S. Pat. No. 2,431,866, 2,856,756 and in McClintock's treatise "Cryogenics," Reinhold Publ., 1964. The output streams usually consist essentially of $O_2$ or $N_2$ gas.

The oxygen-rich stream and nitrogen carrier gas can also be provided by other types of air separators. In recent years considerable effort has been expended in developing a selective adsorption unit known as a pressure swing system. Taking advantage of the preferential adsorption of nitrogen gas from air, these systems use reduced pressure to alter the equilibrium conditions to recover the adsorbed nitrogen. Typical pressure swing air separating devices are described in U.S. Pat. Nos. 3,564,816, 3,717,974 and 3,738,087, incorporated herein by reference.

A high gas throughput corona generator suitable for the present system is described in U.S. Pat. No. 3,798,457 and in copending U.S. Pat. Application Ser. No. 509,278, filed Sept. 25, 1974, incorporated herein by reference. Ozonizers of this type are operable at a very high rate of oxygen gas throughput. For instance, a parallel flat plate generator is operated at a gas:electrode ratio of about 25 liters sec$^{-1}$ m$^{-2}$, based on effective single electrode area, with a power input of about 16 Kw/m$^2$. At input pressure of about 2 atmospheres, ozone is produced at a concentration increase of about 0.5 wt% per stage with an inlet temperature of about 20°C and outlet temperature of about 90°C.

High throughput of oxygen-rich gas permits efficient operation of the corona generator. This is due largely to maintaining the ozone-containing oxygen stream at a low temperature, preferably below about 100°C. As compared to typical water-cooled generators, the air-cooled units provide high electrical space efficiency, usually about 15 to 50 Kw/m$^2$ electrode area. Removing the ozone-containing stream from the corona at less than 1 wt% $O_3$ incremental increase is economically feasible where the oxygen stream is recovered and recycled.

Exit gas leaving the final corona generator stage usually has a temperature of about 50° to 100°C, and should be cooled to about ambient temperature (e. g., 0° to 35°C) before the adsorption step. Heat exchangers of the fintube type may be employed between ozonizing stages and at the end to cool the oxygen-rich gas stream for more efficient adsorption by silica gel. Ambient air can be used as the cooling medium for gas-to-gas heat exchange. Other suitable cooling units, such as water-cooled shell and tube, are also suitable for use in the present system.

The ozone generator units may be operated under wide variations in power conditions. High throughput corona devices are available which operate at relatively high power density, typically at 15-50 Kw/m$^2$ based on continuous average power per unit of effective electrode area. Advances in corona discharge power sources for ozone production provide improvements in the power utilization which can be advantageous to the present system. A suitable SCR power device is described in U.S. Pat. No. 3,784,838; however, other electrical systems may be employed to obtain power density adequate for a high gas throughput system. Overall electrical efficiency is usually expressed as the amount of power consumed per weight unit of ozone produced, and current technology can make ozone at less than 5 watt-hours per gram (W-H/$_{gm}$), while maintaining good throughput gas rate, for instance about 25 liters/m$^2$-sec.

The adsorption step may be carried out under a variety of process conditions from refrigeration temperatures to ambient and from sub-atmospheric to super-atmospheric pressures. For purposes of economy, it is preferred to adsorb the ozone from a stream containing 1 to 3% $O_3$ and 90 + % $O_2$ at a temperature of about −50°C to + 35°C and about 1 to 5 atmospheres. Optimum conditions are 2% $O_3$, 98% $O_2$ and −10° to 20°C at pressure greater than 1 atmosphere. Adsorption is virtually complete, with little or no $O_3$ in the $O_2$ gas until bed saturation is reached.

Ozone-laden silica gel can be stripped easily by dry air or nitrogen-rich gas at slightly below adsorption pressure, as in a moderate vacuum, employing ambient gas temperatures of 0° to 35°C. A preferred adsorption-desorption time cycle is about 5 minutes; however, cycle time is a function of bed size and fluid handling equipment capabilities. A typical system for adsorption of 2% $O_3$ in 98% $O_2$ with a 5 minute cycle time uses about 5 parts adsorbent per weight part of $O_3$ per day (e g., 5 gm of silica gel per 1 gm daily capacity).

Adsorption units 30, 32 may be of conventional construction, comprising a closed vessel or tower which is packed with an adsorbent bed of silica gel particles, such as Davison Type 407. In order to achieve a continuous process, multiple adsorbing towers piped in parallel are employed. Any number of towers may be used; however, two or three are preferred for most processes to limit capital expenditures. The gas switching may be accomplished manually or automatically to provide a cyclic system for alternating adsorbent bed service. Between adsorption and desorption cycles it may be desirable to evacuate the towers to remove oxygen or carrier gas to prevent contamination of the product stream or the recycle stream. Appropriate pumping equipment may be added to the flow sheet in the drawing to accomplish this, in a manner known to one skilled in the art. The adsorption process may be carried out using the same downstream pressure as the ozone generators or a slight amount of compression can be added to facilitate adsorption. The bed saturation is a function of ozone partial pressure and the equilibrium conditions may be used advantageously between the adsorption and desorption steps. Ozone separation from an oxygen stream on a continuous basis has been described in detail in U.S. Pat. No.

2,872,397, incorporated herein by reference. In the preferred embodiments of the invention, the ozone concentration is 1 to 2 wt% or more, with a timing cycle of 1 minute to 100 minutes. The silica gel bed size depends on a number of factors; adsorption temperature, ozone partial pressure, cycle time, etc. The weight of adsorbent is usually more than 5 times the daily weight production of ozone, and may be 20 to more than 1000 times depending upon design criteria.

The adsorbent used for separating ozone from the generator exit gas stream should have several properties including a high ozone selectivity and relatively low adsorption for oxygen or nitrogen. The adsorbent should be easily reactivated to remove minor process components or impurities, such as water. Solid particulate materials having an average particle size of 100–1000 $\mu$ are preferred from the standpoint of equipment design and ease of process fluid handling. The preferred adsorbents have a large ozone sorption capacity under moderate operating conditions and are easily stripped or desorbed by nitrogen-rich gas under ambient temperature/pressure conditions. While halogenated hydrocarbon liquids or various crystalline aluminosilicates may have limited utility as a selective ozone adsorbent, prior art attempts have been most successful in the use of silica gel. Articles by Cook et al and Balcar et al in "Advances in Chemistry Series No. 21", American Chem. Soc. 1959, describe various systems for ozone sorption and transfer to a carrier gas.

The preferred adsorbent for use in the present system is Davison 407 silica gel (8–20 mesh size, U. S. Sieve). The bed adsorption characteristics are given in the article by Cook et al, supra.

What is claimed is:

1. A continuous ozone generation and recovery system which comprises:
   a. means for separating air into an oxygen-rich gas stream and a nitrogen-rich gas stream;
   b. at least one corona discharge ozone generator;
   c. means for passing the oxygen-rich gas streams through said ozone generator to synthesize ozone in low concentration;
   d. means for cooling the ozone containing oxygen-rich gas stream from means (c);
   e. means for contacting the cooled gas stream from means (d) with a solid ozone adsorbent to adsorb ozone therefrom;
   f. means for recycling the oxygen-rich gas stream from means (e) to the ozone generator; and
   g. means for desorbing the adsorbed ozone from the adsorbent using said nitrogen-rich gas stream from means (a).

2. The system of claim 1 wherein said separating means (a) comprises a pressure swing molecular sieve air fractionation apparatus.

3. The system of claim 1 wherein at least one heat exchanger is operatively connected between a plurality of corona discharge zone generators.

4. The system of claim 1 wherein said separating means (a) comprises a cryogenic air liquefication and fractionation means.

5. The system of claim 1 further comprising a plurality of solid ozone adsorbent beds,
   valve means operatively connected between a final ozone generator stage and the adsorbent beds for directing ozone-containing oxygen gas to a selected adsorbent bed while simultaneously directing nitrogen-rich gas to a different adsorbent bed; and
   means for alternating ozone adsorption and desorption in each of the adsorbent beds.

6. The system of claim 5 further comprising auxiliary oxygen separation means operatively connected in a recycle conduit between the adsorbent beds and a first ozone generator stage for providing clean oxygen-rich recycle gas.

7. The system of claim 5 wherein the adsorbent beds consist essentially of silica gel having an average particle size of at least about 100 $\mu$.

* * * * *